(12) United States Patent
Yoshiki et al.

(10) Patent No.: US 9,994,158 B2
(45) Date of Patent: Jun. 12, 2018

(54) WORKING VEHICLE

(71) Applicant: ISEKI & CO., LTD., Matsuyama-Shi, Ehime-Ken (JP)

(72) Inventors: Shinya Yoshiki, Ehime-Ken (JP); Ryota Nagano, Ehime-Ken (JP); Yoshitaka Takechi, Ehime-Ken (JP)

(73) Assignee: ISEKI & CO., LTD., Matsuyama-Shi, Ehime-Ken (JP)

( * ) Notice: Subject to any disclaimer, the term of this patent is extended or adjusted under 35 U.S.C. 154(b) by 0 days. days.

(21) Appl. No.: 15/376,952

(22) Filed: Dec. 13, 2016

(65) Prior Publication Data

US 2017/0225622 A1   Aug. 10, 2017

(30) Foreign Application Priority Data

Feb. 5, 2016   (JP) .................................. 2016-020663

(51) Int. Cl.
| | |
|---|---|
| *B60R 3/00* | (2006.01) |
| *B60K 15/063* | (2006.01) |
| *B60N 3/02* | (2006.01) |
| *B60K 15/067* | (2006.01) |
| *B60K 15/03* | (2006.01) |

(52) U.S. Cl.
CPC .............. *B60R 3/00* (2013.01); *B60K 15/063* (2013.01); *B60K 15/067* (2013.01); *B60N 3/02* (2013.01); *B60K 2015/03118* (2013.01); *B60K 2015/0634* (2013.01); *B60Y 2200/221* (2013.01)

(58) Field of Classification Search
CPC .... B60R 3/00; B60K 15/063; B60K 15/0631; B60K 15/0634; B60K 15/067; B60K 2015/03118; B60K 2015/0634; B60N 3/02; B60Y 2200/221
USPC ............................ 280/163, 164.1, 169, 762
See application file for complete search history.

(56) References Cited

U.S. PATENT DOCUMENTS

| | | | | |
|---|---|---|---|---|
| 5,593,167 | A * | 1/1997 | Barnhardt ................. | B60R 3/00 180/68.5 |
| 6,971,657 | B2 * | 12/2005 | King ......................... | B60R 3/00 182/127 |
| 8,801,019 | B2 * | 8/2014 | Fujimoto ................... | B60R 3/00 280/163 |
| 9,238,941 | B2 * | 1/2016 | Ellement ................... | B60R 3/02 |

* cited by examiner

*Primary Examiner* — John D Walters
(74) *Attorney, Agent, or Firm* — Bacon & Thomas, PLLC

(57) ABSTRACT

A working vehicle, including: a driving unit into which a worker gets to perform driving, the driving unit being provided to a vehicle-body; a step on which the worker steps when getting in or out of the vehicle, the step being provided at an outer side of a floor of the driving unit with respect to a left-and-right direction of the vehicle-body; a fuel tank provided below the floor so as to be adjacent to the step; and a fuel tank supporting bracket which supports the fuel tank from below, wherein the step has an upper side step part, and a lower side step part, the upper side step part is attached to the floor, and the lower side step part is attached to the fuel tank supporting bracket.

6 Claims, 6 Drawing Sheets

WORKING VEHICLE

BACKGROUND OF THE INVENTION

Field of the Invention

The present invention relates to a working vehicle such as an agricultural tractor or the like.

Known is a working vehicle such as an agricultural tractor or the like (for example, refer to Japanese Patent Application Publication No. 2012-12045).

A working vehicle like this comprises, for example, a driving unit, and a step.

The driving unit into which a worker gets to perform driving is provided to the vehicle-body.

The step on which the worker steps when getting in or out of the vehicle is provided at an outer side of the floor of the driving unit with respect to the left-and-right direction of the vehicle-body.

SUMMARY OF THE INVENTION

Now, in a configuration such that a final speed-changing mechanism provided between the output shaft from the rear wheel differential mechanism arranged in the inner part of the transmission case, and the rear wheels exists, where gears are arranged in the up-and-down direction, the position of the transmission case becomes high and, since the minimum ground clearance is prone to become large, the mat upper face height corresponding to the position of the floor also becomes large.

However, in a conventional working vehicle like this, there is a fear that concentration of the step load to specific members to which the step is attached is generated.

The present invention furnishes, in consideration of the above described conventional problem, a working vehicle for which a fear that concentration of the step load to specific members to which the step is attached is generated is able to be reduced.

The $1^{st}$ aspect of the present invention is a working vehicle, comprising:

a driving unit into which a worker gets to perform driving, the driving unit being provided to a vehicle-body;

a step on which the worker steps when getting in or out of the vehicle, the step being provided at an outer side of a floor of the driving unit with respect to a left-and-right direction of the vehicle-body;

a fuel tank provided below the floor so as to be adjacent to the step; and a fuel tank supporting bracket which supports the fuel tank from below, wherein the step has an upper side step part, and a lower side step part, the upper side step part is attached to the floor, and the lower side step part is attached to the fuel tank supporting bracket.

By means of this, since the upper side step part is attached to the floor, and the lower side step part is attached to the fuel tank supporting bracket, a fear that concentration of the step load to specific members to which the step is attached is generated can be reduced.

The $2^{nd}$ aspect of the present invention is the working vehicle according to the $1^{st}$ aspect of the present invention, comprising a first gripping member which the worker grasps when getting in or out of the vehicle, wherein the first gripping member is attached to the upper side step part and the floor.

By means of this, since the first gripping member is attached to the upper side step part and the floor, the worker can get in or out of the vehicle securely grasping the first gripping member.

The $3^{rd}$ aspect of the present invention is the working vehicle according to the $2^{nd}$ aspect of the present invention, wherein one end of the first gripping member is attached to an outer side part of the upper side step part, and another end of the first gripping member is attached to a front part of the floor, at a front side of the upper side step part.

By means of this, since another end of the first gripping member is attached to the front part of the floor, at the front side of the upper side step part, the worker can get in or out of the vehicle securely grasping the first gripping member with the hand at the side of the front part of the floor.

The $4^{th}$ aspect of the present invention is the working vehicle according to the $1^{st}$ aspect of the present invention, comprising:

a second gripping member which the worker grasps when getting in or out of the vehicle; and a rear wheel fender provided behind the floor, wherein the second gripping member is attached to the upper side step part and the rear wheel fender.

By means of this, since the second gripping member is attached to the upper side step part and the rear wheel fender, the worker can get in or out of the vehicle securely grasping the second gripping member with the hand at the side of the rear wheel fender.

The $5^{th}$ aspect of the present invention is the working vehicle according to the $2^{nd}$ aspect of the present invention, comprising:

a second gripping member which the worker grasps when getting in or out of the vehicle; and a rear wheel fender provided behind the floor, wherein the second gripping member is attached to the upper side step part and the rear wheel fender.

By means of this, since the second gripping member is attached to the upper side step part and the rear wheel fender, the worker can get in or out of the vehicle securely grasping the second gripping member with the hand at the side of the rear wheel fender.

The $6^{th}$ aspect of the present invention is the working vehicle according to the $3^{rd}$ aspect of the present invention, comprising:

a second gripping member which the worker grasps when getting in or out of the vehicle; and a rear wheel fender provided behind the floor, wherein the second gripping member is attached to the upper side step part and the rear wheel fender.

By means of this, since the second gripping member is attached to the upper side step part and the rear wheel fender, the worker can get in or out of the vehicle securely grasping the second gripping member with the hand at the side of the rear wheel fender.

By the present invention, a working vehicle for which a fear that concentration of the step load to specific members to which the step is attached is generated is able to be reduced can be furnished.

Figure 1:
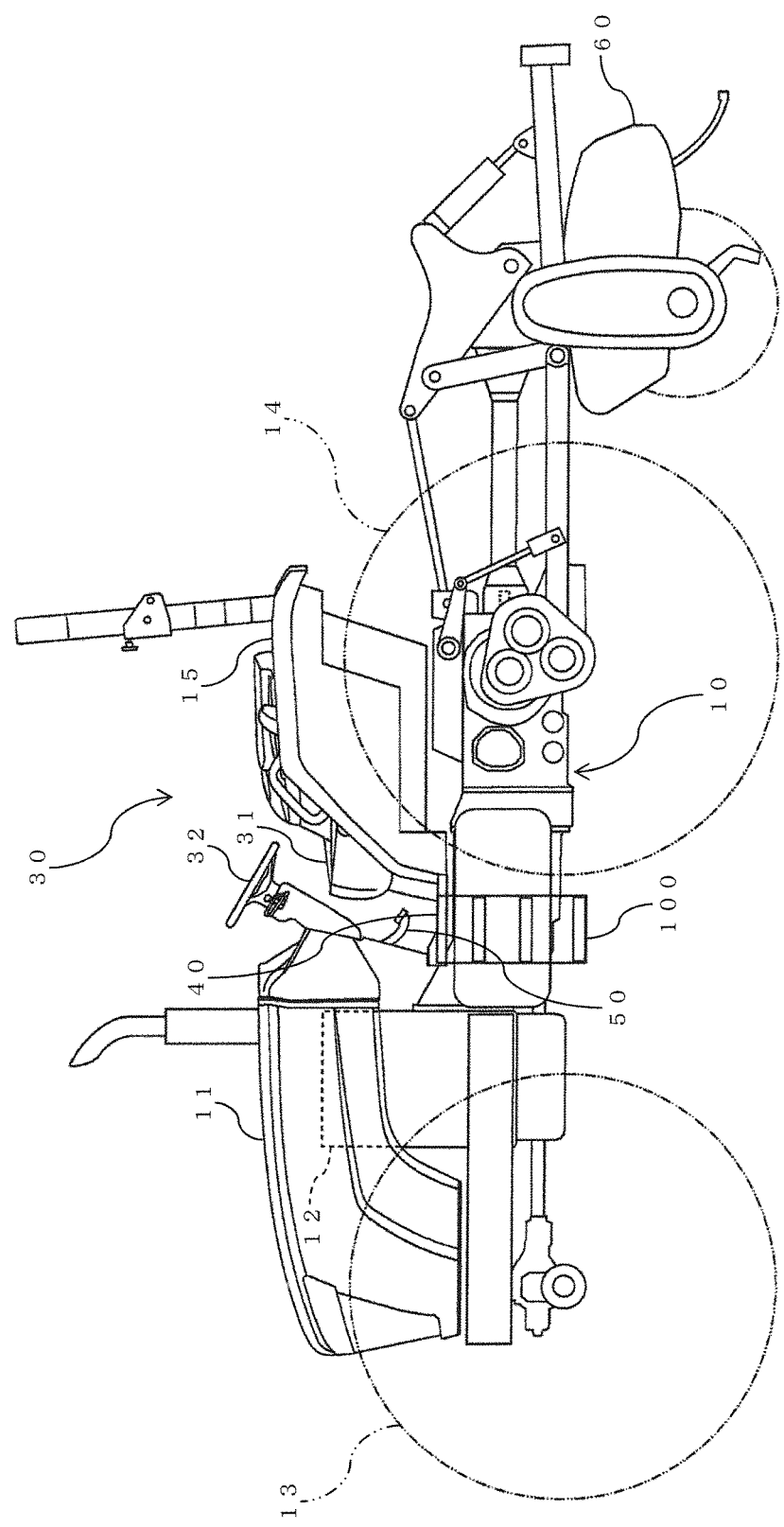
FIG. 1 is a schematic left side view of the agricultural tractor of the embodiment in the present invention.

DESCRIPTION OF THE REFERENCE NUMERALS 10 vehicle-body
11 bonnet
12 engine
13 front wheel
14 rear wheel
15 rear wheel fender
20 transmission case
30 driving unit
31 driving seat
32 steering handle
33 first gripping member
34 second gripping member
40 floor
50 brake pedal
60 working machine
100 step
101 upper side step part
102 lower side step part
110 upper stair step plate
120 middle stair step plate
130 lower stair step plate
140 frame
500 main fuel tank
500L left side main fuel tank part
500R right side main fuel tank part
510 main fuel tank supporting bracket
600 sub-fuel tank
610 sub-fuel tank supporting bracket
620 sub-fuel tank cover
700 fuel tank communication member
710 fuel tank communication member cover
800 fuel tank supporting member
901 main fuel tank breather hose
902 sub-fuel tank breather hose
903 T-shaped circuit

DETAILED DESCRIPTION OF THE INVENTION

In the following, referring to the drawings, descriptions are given in detail regarding embodiments in the present invention.

Figure 2:
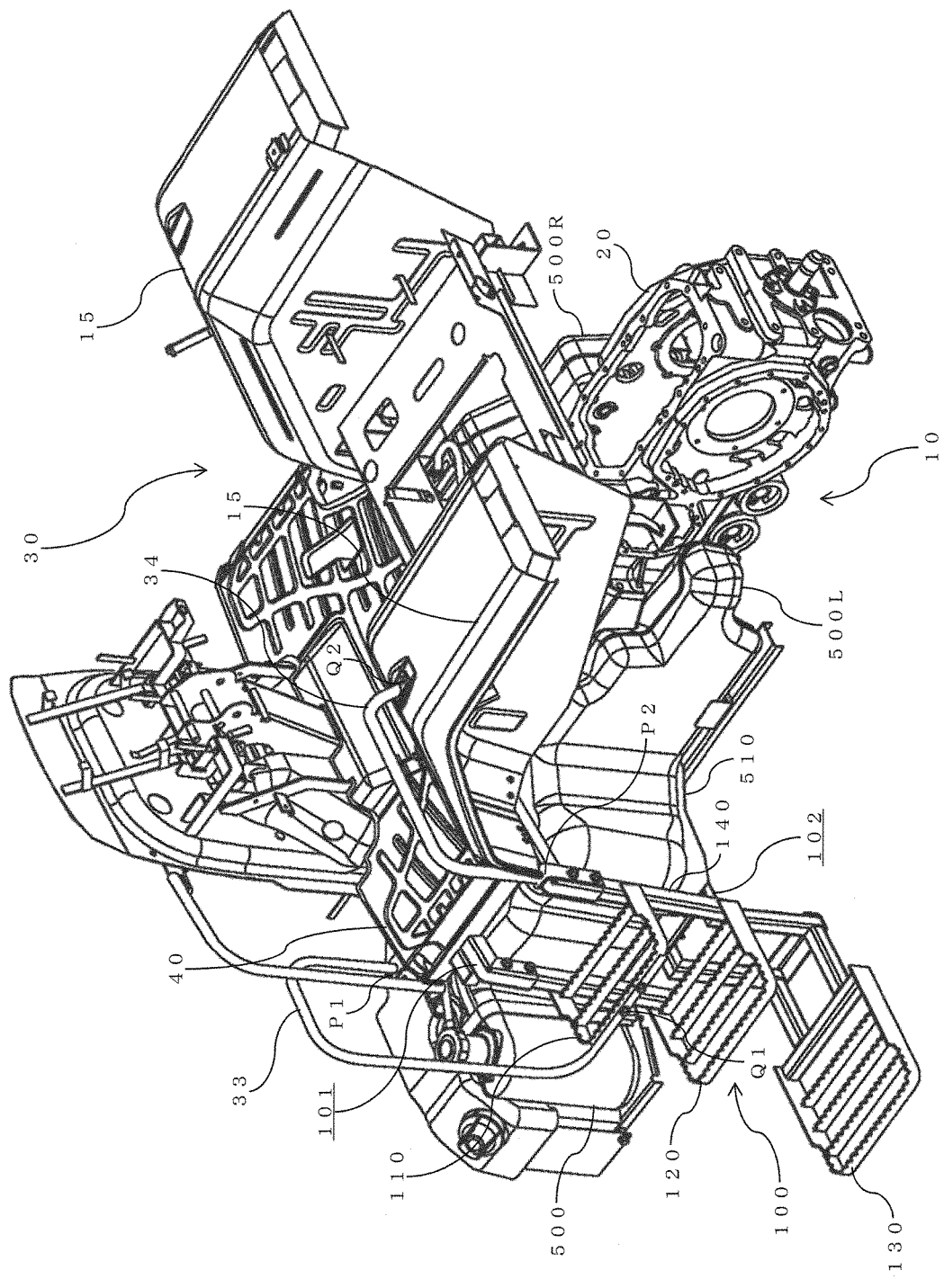
FIG. 2 is a partial perspective view (No. 1) of the neighborhood of the transmission case of the agricultural tractor of the embodiment in the present invention.
Figure 3:
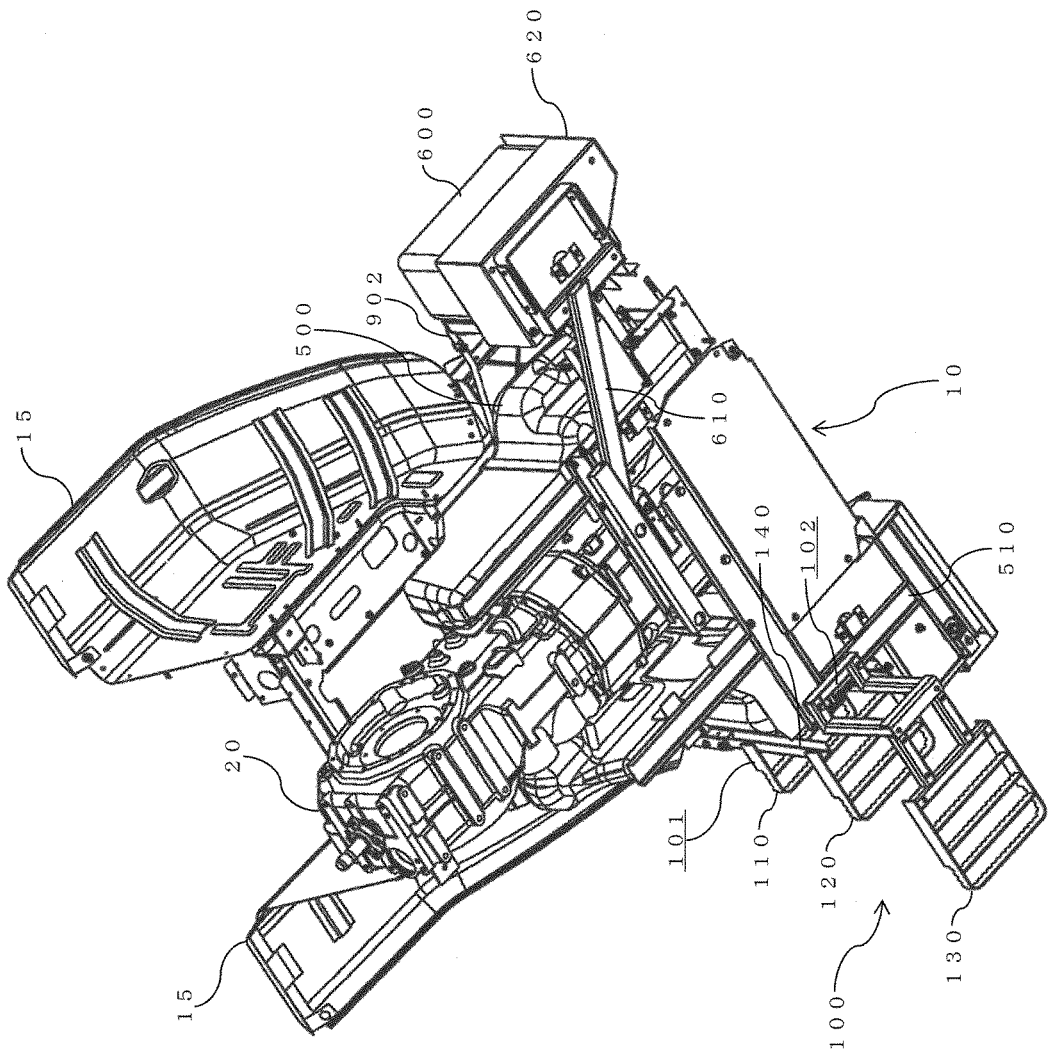
FIG. 3 is a partial perspective view (No. 2) of the neighborhood of the transmission case of the agricultural tractor of the embodiment in the present invention.

In the beginning, referring to FIGS. 1 to 3, descriptions are specifically given regarding the configuration and action of an agricultural tractor of the present embodiment which is one example of the working vehicle in the present invention.

Here, FIG. 1 is a schematic left side view of the agricultural tractor of the embodiment in the present invention, and FIGS. 2 and 3 are partial perspective views (Nos. 1 and 2) of the neighborhood of a transmission case 20 of the agricultural tractor of the embodiment in the present invention.

In FIG. 1, a first gripping member 33, a second gripping member 34 and the like are not shown, so that descriptions in the following will become easier to understand.

The agricultural tractor of the present embodiment is viewed from the left upper rear side in FIG. 2, and is viewed from the right lower rear side in FIG. 3.

In FIGS. 2 and 3, rear wheels 14 and the like are not shown, so that descriptions in the following will become easier to understand.

What is described at the beginning is the fundamental configuration and action of the agricultural tractor of the present embodiment. Hence, regarding the configuration and action and the like which are related to a step 100 and a sub-fuel tank 600, descriptions are later given in detail.

In the inner part of a bonnet 11 of the front part of a vehicle-body 10, an engine 12 is provided.

The transmission case 20 is provided below a floor 40 of a driving unit 30.

Rotary motive force of the engine 12 is transmitted via an HST (Hydro Static Transmission) to a speed-changing device of the inner part of the transmission case 20. And, the rotary motive force with speed-decreasing having been carried out at the relevant speed-changing device is transmitted to left and right front wheels 13 and the left and right rear wheels 14.

Behind the engine 12, a steering handle 32 for carrying out steerage with the front wheels 13 is provided.

Behind the steering handle 32, a driving seat 31 is provided.

At the rear part of the vehicle-body 10, a working machine 60 such as a rotary tilling device or the like is installed utilizing a mechanism such as a 3-point link mechanism or the like.

A hose cover covers hoses joined to the steering handle 32.

On the floor 40 at the right side of an operation column cover, a brake pedal 50 for performing braking with the rear wheels 14 in correspondence to a stepping-on operation of a worker is arranged.

On the floor 40 at the right side of the operation column cover, an HST pedal (not shown) is arranged.

Next, referring to FIGS. 1 to 3, descriptions are more specifically given regarding the configuration and action of the agricultural tractor of the present embodiment.

To the vehicle-body 10, the driving unit 30 into which the worker gets to perform driving, and the transmission case 20 are provided.

Behind the floor 40, rear wheel fenders 15 are provided.

The step 100 on which the worker steps when getting in or out of the vehicle is provided at an outer side of the floor 40 of the driving unit 30 with respect to the left-and-right direction of the vehicle-body 10.

In the present embodiment, the step 100 is provided at the left side of the vehicle-body 10.

Of course, in an embodiment of a variant example, the step 100 may be provided at the right side of the vehicle-body 10.

The step 100 has an upper side step part 101, and a lower side step part 102.

The upper side step part 101 is attached to the floor 40.

The attachment of the upper side step part 101 might be performed utilizing welding, bolt joining or the like.

The outer fringe of the lower side step part 102 with respect to the left-and-right direction of the vehicle-body 10 is, in comparison with the outer fringe of the upper side step part 101 with respect to the left-and-right direction of the vehicle-body 10, positioned at an outer side with respect to the left-and-right direction of the vehicle-body 10.

Thus, the worker can safely get in or out of the vehicle stepping on the step 100. For example, when the worker gets into the driving unit 30, a knee of the worker almost never hits against the upper side step part 101.

A main fuel tank 500 is provided below the floor 40 so as to be adjacent to the step 100, and is provided at an outer side of the transmission case 20 with respect to the left-and-right direction of the vehicle-body 10.

In the present embodiment, the main fuel tank 500 is provided at the left side and the right side of the vehicle-body 10. That is to say, the main fuel tank 500 has a left side main fuel tank part 500L and a right side main fuel tank part 500R.

A main fuel tank supporting bracket 510 supports the main fuel tank 500 from below.

One end of the main fuel tank supporting bracket 510 is directly attached to the lower part of the transmission case 20.

In an embodiment of a variant example, one end of the main fuel tank supporting bracket 510 may be indirectly attached to the lower part of the transmission case 20. For example, one end of the main fuel tank supporting bracket 510 may be indirectly attached to the lower part of the transmission case 20 via a main fuel tank supporting member.

The first gripping member 33 which the worker grasps when getting in or out of the vehicle is straddlingly attached to the upper side step part 101 and the floor 40.

One end of the first gripping member 33 is attached to an outer side part of the upper side step part 101, and another end of the first gripping member 33 is attached to the front part of the floor 40, at the front side of the upper side step part 101.

The attachment of the first gripping member 33 might be performed utilizing welding, bolt joining or the like at the positions P1 and Q1, and a shape, a material and the like such that the worker easily grasps the first gripping member 33 are desirable.

Thus, the worker can get in or out of the vehicle securely grasping the first gripping member 33 with the hand at the side of the front part of the floor 40. In the present embodiment, since the step 100 is provided at the left side of the vehicle-body 10 as described above, the hand at the side of the front part of the floor 40 is the left hand.

Since the first gripping member 33 is extended as far as the upper face of the firm floor 40 to be fixed, a woman, an aged person or the like whose leg strength is not necessarily sufficient could get in or out of the vehicle safely grasping the first gripping member 33.

And, since the step 100 is consequently reinforced by the floor 40 via the first gripping member 33, the step strength is improved without cost increase. Further, since a dedicated member to which the first gripping member 33 is attached is unnecessary, there is almost no fear that the number of components increases.

The second gripping member 34 which the worker grasps when getting in or out of the vehicle is straddlingly attached to the upper side step part 101 and the rear wheel fender 15.

The attachment of the second gripping member 34 might be performed utilizing welding, bolt joining or the like at the positions P2 and Q2, and a shape, a material and the like such that the worker easily grasps the second gripping member 34 are desirable.

Thus, the worker can get in or out of the vehicle securely grasping the second gripping member 34 with the hand at the side of the rear wheel fender 15. In the present embodiment, since the step 100 is provided at the left side of the vehicle-body 10 as described above, the hand at the side of the rear wheel fender 15 is the right hand.

Since the second gripping member 34 is extended as far as the upper face of the firm rear wheel fender 15 to be fixed, a woman, an aged person or the like whose leg strength is not necessarily sufficient could get in or out of the vehicle safely grasping the second gripping member 34.

And, since the step 100 is consequently reinforced by the rear wheel fender 15 via the second gripping member 34, the step strength is improved without cost increase. Further, since a dedicated member to which the second gripping member 34 is attached is unnecessary, there is almost no fear that the number of components increases.

By a configuration like this, a woman, an aged person or the like could get in or out of the vehicle grasping the first gripping member 33 and the second gripping member 34 with both hands.

Figure 4:
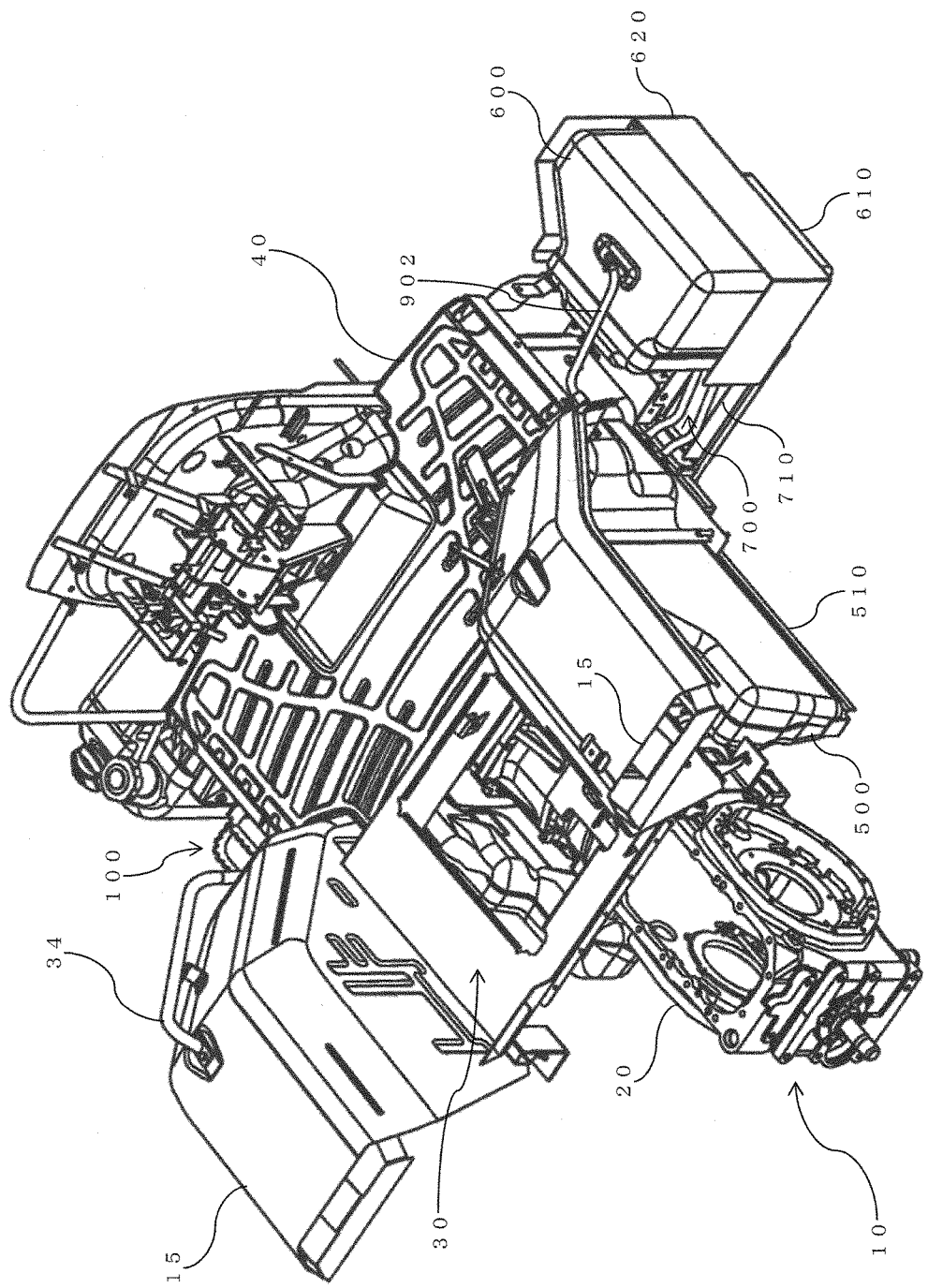
FIG. 4 is a partial perspective view (No. 3) of the neighborhood of the transmission case of the agricultural tractor of the embodiment in the present invention.

Next, mainly referring to FIGS. 2 to 4, descriptions are further more specifically given regarding the configuration and action of the agricultural tractor of the present embodiment.

Here, FIG. 4 is a partial perspective view (No. 3) of the neighborhood of the transmission case 20 of the agricultural tractor of the embodiment in the present invention.

The agricultural tractor of the present embodiment is viewed from the right upper rear side in FIG. 4.

In FIG. 4, the rear wheels 14 and the like are not shown, so that descriptions in the following will become easier to understand.

In the first place, descriptions are given regarding the configuration and action which are related to the step 100.

The lower side step part 102 is attached to the main fuel tank supporting bracket 510.

In the present embodiment, the main fuel tank 500 is one example of the fuel tank in the present invention, and the main fuel tank supporting bracket 510 is one example of the fuel tank supporting bracket in the present invention.

Descriptions are given in detail as follows.

The upper side step part 101 has an upper stair step plate 110, a middle stair step plate 120, and a frame 140 to which the upper stair step plate 110 and the middle stair step plate 120 are attached.

The lower side step part 102 has a lower stair step plate 130.

In a configuration such that a final speed-changing mechanism provided between the output shaft from the rear wheel differential mechanism arranged in the inner part of the transmission case 20, and the rear wheels 14 exists, where gears are arranged in the up-and-down direction, the position of the transmission case 20 becomes high and, since the minimum ground clearance is prone to become large, the mat upper face height corresponding to the position of the floor 40 also becomes large.

In a configuration like this suited to dry field farming such that the height, the ridge width and the like of the crops being cultivated are various, which is often adopted in a so-called high-clearance style, a user-friendly three-stairstep-plate style which utilizes the upper stair step plate 110, the middle stair step plate 120 and the lower stair step plate 130 is effective.

Of course, in an embodiment of a variant example, a user-friendly configuration like this such that the worker easily gets in or out of the vehicle may be realized, for example, by a four-stair-step-plate style instead of the three-stair-step-plate style.

In the present embodiment, the lower side step part 102 is attached to the main fuel tank supporting bracket 510 as described above.

Hence, division of the step 100 into the upper side step part 101 which is attached to the floor 40, and the lower side step part 102 which is attached to the main fuel tank supporting bracket 510 is performed, so that concentration of the step load to specific members to which the step 100 is attached is not generated.

A configuration such that the lower side step part 102 is attached to the main fuel tank supporting bracket 510 is realized by an inexpensive detachment/attachment mechanism which utilizes bolts or the like.

The lengths of the upper side step part 101 and the lower side step part 102 are small in comparison with the length of the step of a current machine and, since the rigidity of the upper side step part 101 and the lower side step part 102 is ensured, the step strength is improved. And, since the style of the step of a current machine is utilizable also as the style of the upper side step part 101 which is suspended from the frame of the floor 40 or the like, there is almost no fear that designing becomes troublesome.

In an embodiment of a variant example, a configuration such that the lower side step part 102 is attached to the main fuel tank supporting bracket 510 may be realized, for example, by a convenient slide mechanism.

Thus, the position where the lower side step part 102 is attached to the main fuel tank supporting bracket 510 can be set up so as to reduce a fear that the step 100 damages the crops being cultivated.

And, since the step 100 is supported by the firm floor 40 and the main fuel tank supporting bracket 510, the step strength is improved without cost increase. Further, since a dedicated member to which the lower side step part 102 is attached is unnecessary, there is almost no fear that the number of components increases.

In the second place, descriptions are given regarding the configuration and action which are related to the sub-fuel tank 600.

The sub-fuel tank 600 is provided at an outer side of the main fuel tank 500 with respect to the left-and-right direction of the vehicle-body 10.

In the present embodiment, the sub-fuel tank 600 is provided at the right side of the vehicle-body 10 which is opposite to the left side of the vehicle-body 10 where the step 100 is provided.

Since the side where the sub-fuel tank 600 is provided is opposite to the side where the step 100 is provided, there is almost no fear that imbalance with respect to the left-and-right direction of the vehicle-body 10 is generated not only regarding the space occupation relation but also regarding the left-and-right weight relation.

Of course, in an embodiment of a variant example, with the step 100 being provided at the right side of the vehicle-body 10, the sub-fuel tank 600 may be provided at the left side of the vehicle-body 10 which is opposite to the right side of the vehicle-body 10 where the step 100 is provided.

A sub-fuel tank supporting bracket 610 supports the sub-fuel tank 600 from below.

One end of the sub-fuel tank supporting bracket 610 is directly attached to the lower part of the transmission case 20.

Figure 5:
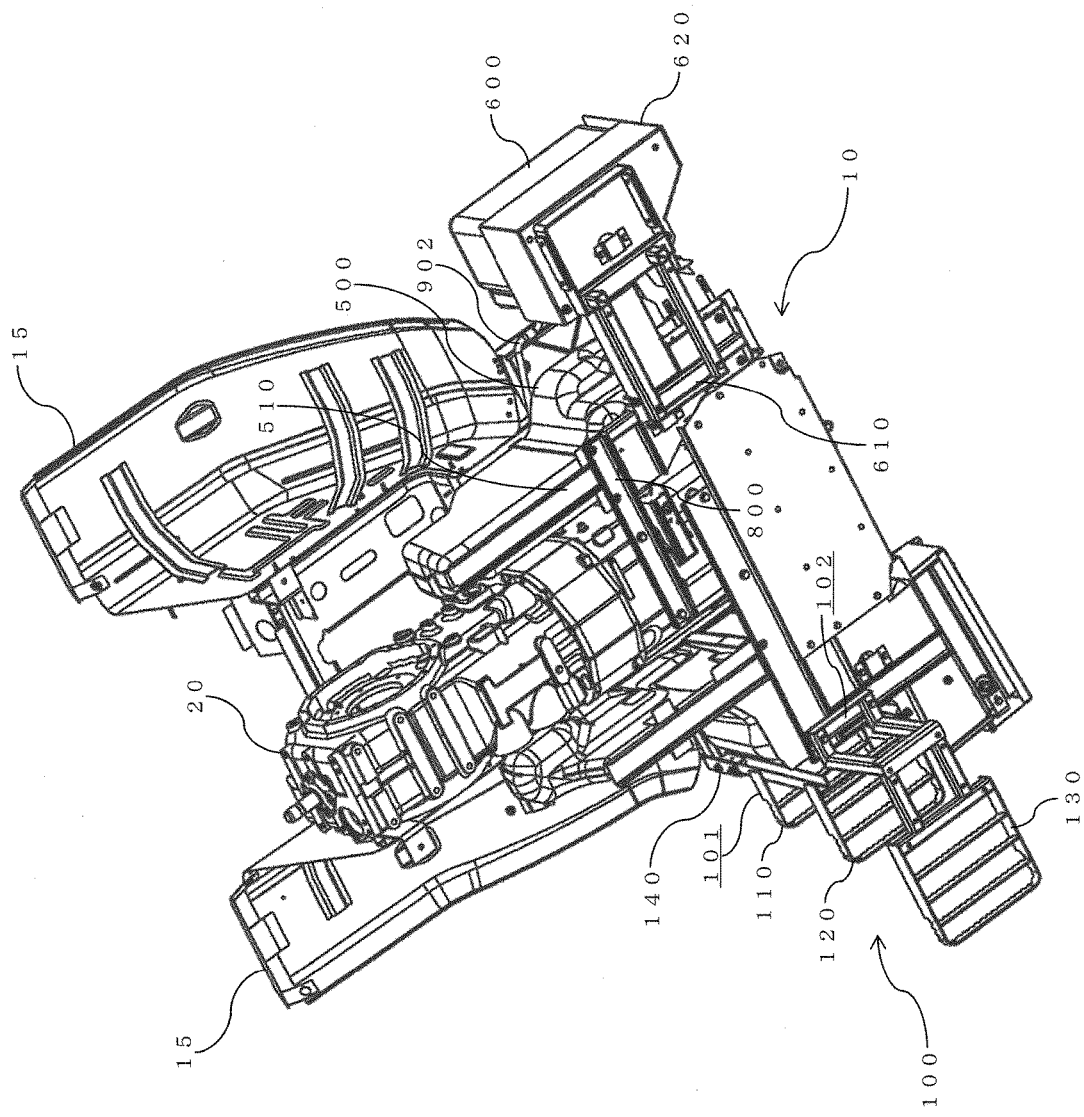
FIG. 5 is a partial perspective view of the neighborhood of the transmission case of the agricultural tractor of the embodiment of a variant example in the present invention.

Additionally, one end of the sub-fuel tank supporting bracket 610 may be indirectly attached to the lower part of the transmission case 20. For example, as is indicated in FIG. 5 which is a partial perspective view of the neighborhood of the transmission case 20 of the agricultural tractor of the embodiment of a variant example in the present invention, one end of the sub-fuel tank supporting bracket 610 may be indirectly attached to the lower part of the transmission case 20, via a fuel tank supporting member 800 also for indirectly attaching one end of the main fuel tank supporting bracket 510 to the lower part of the transmission case 20.

In the present embodiment, the sub-fuel tank 600 is provided at an outer side of the main fuel tank 500 with respect to the left-and-right direction of the vehicle-body 10 as described above.

Hence, a member which becomes an obstacle regarding the space occupation of the sub-fuel tank 600 does not particularly exist.

Thus, the sub-fuel tank 600 can be arranged so as to reduce a fear that the sub-fuel tank volume becomes not sufficiently ensured.

And, since the sub-fuel tank 600 is supported by the firm transmission case 20, the sub-fuel tank supporting function is improved without cost increase. Further, since a dedicated member to which the sub-fuel tank supporting bracket 610 is attached is unnecessary, there is almost no fear that the number of components increases.

A sub-fuel tank cover 620 covers the lower part of the sub-fuel tank 600, fuel tank communication members 700 make the sub-fuel tank 600 communicate with the main fuel tank 500, and a fuel tank communication member cover 710 covers the lower parts of the fuel tank communication members 700.

Since the sub-fuel tank 600 is protected from mud adhesion from below, obstruction contact and the like by the sub-fuel tank cover 620 which has a shape of a lidless box, and the fuel tank communication members 700 are similarly protected by the fuel tank communication member cover 710, the sub-fuel tank durability and the fuel tank communication member durability are improved. And, since a configuration like this is firm and inexpensive, the cost performance is high.

The fuel tank communication members 700 are two hoses.

Since fuel replenishing to the sub-fuel tank 600, and fuel supplying from the sub-fuel tank 600 to the engine 12 are stably performed by the two hoses, the fuel replenishing function and the fuel supplying function are improved. And, since a configuration like this is firm and inexpensive, the cost performance is high.

Additionally, the fuel tank communication members 700 may be two pipes.

Figure 6:
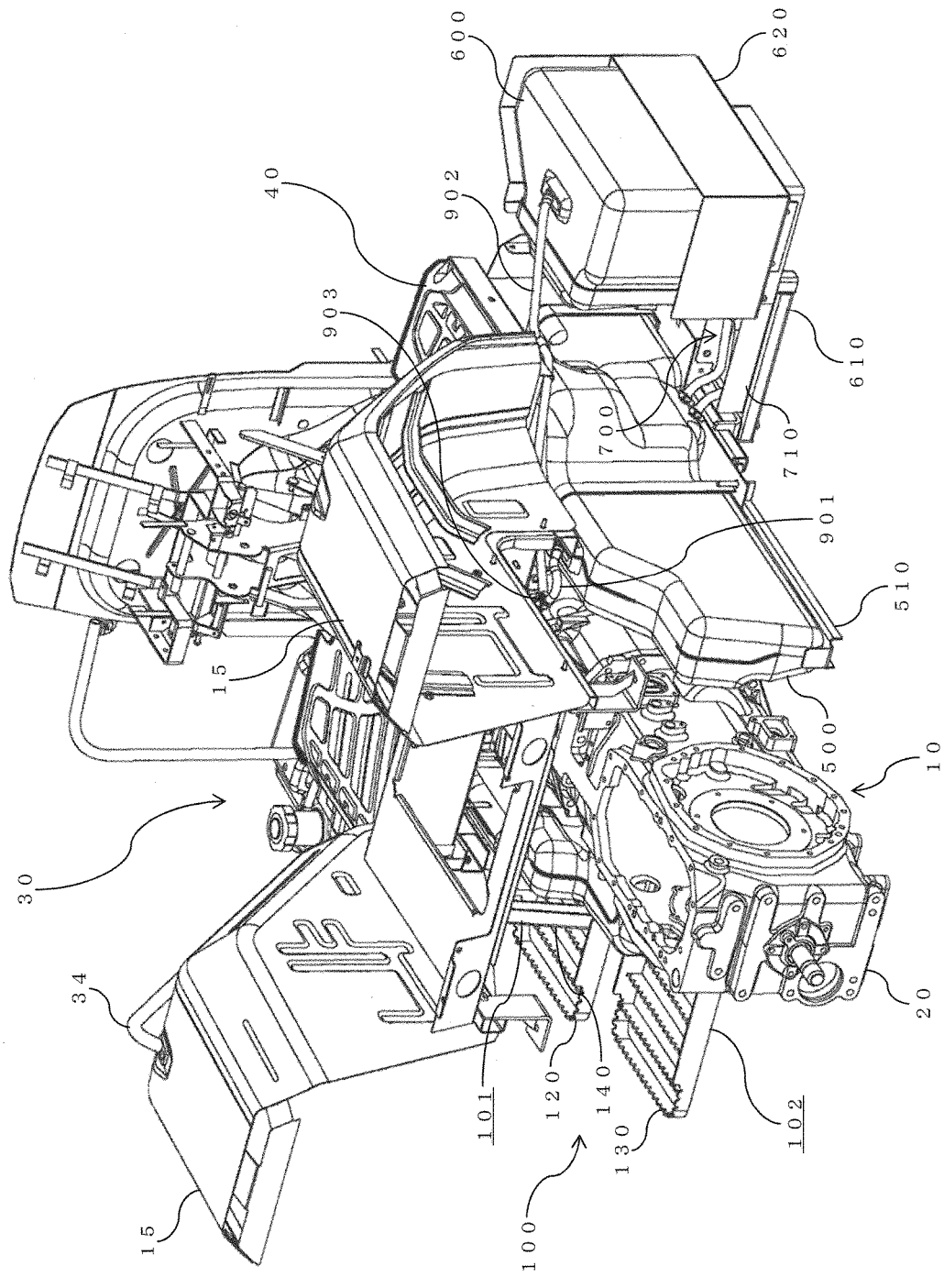
FIG. 6 is a partial perspective view (No. 4) of the neighborhood of the transmission case of the agricultural tractor of the embodiment in the present invention.

As is indicated in FIG. 6, a sub-fuel tank breather hose 902 is joined to a main fuel tank breather hose 901 by a T-shaped circuit 903.

Here, FIG. 6 is a partial perspective view (No. 4) of the neighborhood of the transmission case 20 of the agricultural tractor of the embodiment in the present invention.

The agricultural tractor of the present embodiment is viewed from the right upper rear side in FIG. 6.

In FIG. 6, the rear wheels 14 and the like are not shown, so that descriptions in the following will become easier to understand.

Since a portion of the main fuel tank breather hose 901 functions also as a portion of the sub-fuel tank breather hose 902, the number of components is curtailed.

A working vehicle in the present invention is such that a fear that concentration of the step load to specific members to which the step is attached is generated is able to be reduced, and is useful for the purpose of utilizing for a working vehicle such as an agricultural tractor or the like.

What is claimed is:

1. A working vehicle, comprising:
    a driving unit into which a worker gets to perform driving, the driving unit being provided to a vehicle-body;
    a step on which the worker steps when getting in or out of the vehicle, the step being provided at an outer side of a floor of the driving unit with respect to a left-and-right direction of the vehicle-body;
    a fuel tank provided below the floor so as to be adjacent to the step; and
    a fuel tank supporting bracket which supports the fuel tank from below, wherein
    the step has an upper side step part, and a lower side step part, where division of the step into the upper side step part and the lower side step part is performed so that the upper side step part and the lower side step part are not directly joined to each other,
    the upper side step part is attached to the floor, and
    the lower side step part is attached to the fuel tank supporting bracket.

2. The working vehicle according to claim 1, comprising a first gripping member which the worker grasps when getting in or out of the vehicle, wherein
    the first gripping member is attached to the upper side step part and the floor.

3. The working vehicle according to claim 2, comprising:
    a second gripping member which the worker grasps when getting in or out of the vehicle; and
    a rear wheel fender provided behind the floor, wherein
    the second gripping member is attached to the upper side step part and the rear wheel fender.

4. The working vehicle according to claim 1, comprising:
    a gripping member which the worker grasps when getting in or out of the vehicle; and
    a rear wheel fender provided behind the floor, wherein
    the gripping member is attached to the upper side step part and the rear wheel fender.

5. A working vehicle, comprising:
    a driving unit into which a worker gets to perform driving, the driving unit being provided to a vehicle-body;
    a step on which the worker steps when getting in or out of the vehicle, the step being provided at an outer side of a floor of the driving unit with respect to a left-and-right direction of the vehicle-body;
    a fuel tank provided below the floor so as to be adjacent to the step;
    a fuel tank supporting bracket which supports the fuel tank from below, wherein
    the step has an upper side step part, and a lower side step part,
    the upper side step part is attached to the floor, and
    the lower side step part is attached to the fuel tank supporting bracket; and
    a first gripping member which the worker grasps when getting in or out of the vehicle, wherein the first gripping member is attached to the upper side step part and the floor,
    wherein
    one end of the first gripping member is attached to an outer side part of the upper side step part, and
    another end of the first gripping member is attached to a front part of the floor, at a front side of the upper side step part.

6. The working vehicle according to claim 5, comprising:
    a second gripping member which the worker grasps when getting in or out of the vehicle; and
    a rear wheel fender provided behind the floor, wherein
    the second gripping member is attached to the upper side step part and the rear wheel fender.

* * * * *